US010747839B2

(12) United States Patent
Murdock et al.

(10) Patent No.: US 10,747,839 B2
(45) Date of Patent: Aug. 18, 2020

(54) INTELLIGENT BOOKMARKING WITH COGNITIVE CAPABILITY (71) Applicant: International Business Machines Corporation, Armonk, NY (US)

(72) Inventors: James W. Murdock, Amawalk, NY (US); Sujoy Roy, Kolkata (IN); Radha Mohan De, Howrah (IN); Nisarga Markandaiah, New York, NY (US); Christopher M. Nolan, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 15/973,044

(22) Filed: May 7, 2018

(65) Prior Publication Data
US 2019/0340302 A1 Nov. 7, 2019

(51) Int. Cl.
*G06F 16/955* (2019.01)
*G06F 16/9535* (2019.01)
*G06F 16/2457* (2019.01)

(52) U.S. Cl.
CPC .... *G06F 16/9562* (2019.01); *G06F 16/24578* (2019.01); *G06F 16/9535* (2019.01)

(58) Field of Classification Search
CPC ......... G06F 7/00; G06F 16/9562; G06F 17/30
USPC ...................................................... 707/710
See application file for complete search history.

(56) References Cited

U.S. PATENT DOCUMENTS

| 6,324,566 | B1 | 11/2001 | Himmel et al. | |
|---|---|---|---|---|
| 6,631,496 | B1* | 10/2003 | Li | G06F 16/9562 715/200 |
| 6,981,040 | B1* | 12/2005 | Konig | H04L 67/20 |
| 7,827,170 | B1* | 11/2010 | Horling | G06F 16/24578 707/722 |
| 8,239,367 | B1* | 8/2012 | Zamir | G06F 16/9562 707/710 |
| 8,244,753 | B2 | 8/2012 | Rojer | |
| 8,799,300 | B2 | 8/2014 | Saretto et al. | |
| 8,868,551 | B2 | 10/2014 | Murdock et al. | |

(Continued)

OTHER PUBLICATIONS

Klerkx et al.; "Visualizing Social Boormaks", Journal of Digital Information, vol. 10, issue 2, Jan. 11, 2009, pp. 1-40.*

(Continued)

*Primary Examiner* — Giovanna B Colan
(74) *Attorney, Agent, or Firm* — Pepper Hamilton LLP (57) ABSTRACT

Embodiments may provide a computer implemented method in a data processing system comprising a processor and a memory, the memory comprising instructions that are executed by the processor to cause the processor to implement a system for bookmarking, the method comprising: receiving, by the processor, at least one search query from a user; returning, by the processor, a set of search results and a search score for each search result to the user; recording, by the processor, behavior of the user with respect to the search results; selecting, by the processor, at least one search result based on recorded behavior and the search score; determining, by the processor, at least one topic for the at least one selected search result; and generating, by the processor, a bookmark for each selected search result, under the at least one topic.

19 Claims, 5 Drawing Sheets

(56) References Cited

U.S. PATENT DOCUMENTS

| | | | | | |
|---|---|---|---|---|---|
| 8,924,839 | B2* | 12/2014 | Yonemoto | | G06F 16/437 |
| | | | | | 715/206 |
| 9,009,146 | B1* | 4/2015 | Lopatenko | | G06F 16/9535 |
| | | | | | 707/723 |
| 9,183,499 | B1* | 11/2015 | Krivokon | | G06F 16/951 |
| 9,286,407 | B2* | 3/2016 | Curwen | | G06F 16/9562 |
| 9,565,477 | B2 | 2/2017 | Wiseman et al. | | |
| 9,720,965 | B1 | 8/2017 | Miskie | | |
| 9,811,566 | B1* | 11/2017 | Kim | | G06F 16/24578 |
| 10,157,235 | B2* | 12/2018 | Quintero | | G06F 3/0482 |
| 2005/0131866 | A1* | 6/2005 | Badros | | G06Q 30/0201 |
| 2006/0026173 | A1 | 2/2006 | Amro et al. | | |
| 2006/0282328 | A1* | 12/2006 | Gerace | | G06Q 30/0204 |
| | | | | | 705/14.66 |
| 2007/0185858 | A1* | 8/2007 | Lu | | G06F 16/951 |
| 2007/0244903 | A1* | 10/2007 | Ratliff | | G06F 16/48 |
| 2008/0177858 | A1* | 7/2008 | Aarnio | | G06F 16/9562 |
| | | | | | 709/217 |
| 2011/0231383 | A1* | 9/2011 | Smyth | | G06F 16/3349 |
| | | | | | 707/707 |
| 2011/0289078 | A1* | 11/2011 | Woodard | | G06F 3/04847 |
| | | | | | 707/723 |
| 2014/0298152 | A1* | 10/2014 | Malla | | G06F 16/9562 |
| | | | | | 715/230 |
| 2014/0324828 | A1* | 10/2014 | Hanses | | G06F 16/31 |
| | | | | | 707/722 |
| 2016/0026651 | A1 | 1/2016 | Wetherell | | |
| 2016/0042080 | A1 | 2/2016 | Nguyen | | |
| 2016/0277518 | A1* | 9/2016 | Grant | | H04L 67/22 |
| 2016/0283604 | A1* | 9/2016 | Caputo | | H04L 65/1069 |
| 2018/0232658 | A1* | 8/2018 | Acharya | | G06N 5/04 |
| 2018/0307993 | A1* | 10/2018 | Chawla | | G06F 16/957 |

OTHER PUBLICATIONS

Feng et al.; "Using Semantic Treemaps to Categorize and Visualize Bookmark Files", Proceedings of SPIE, vol. 4665, Jan. 20-25, 2002, pp. 218-227.

Staff et al.; "Automatic Classification of Web Pages Into Bookmark Categories", SIGIR'07 ACM SIGIR Conference on, Jul. 23-27, 2007, pp. 731-732.

Benz et al.; "Automatic Bookmark Classifictaion: A Collaborative Approach", IWI2 WWW 2006 2nd Workshop on, May 22-26, 2006, pp. 1-8.

Teevan, 2007. The re:search engine: simultaneous support for finding and re-finding. In Proceedings of the 20th annual ACM symposium on UIST. ACM, New York, NY, USA, 23-32.

Blei, "Heirarchical Topic Models and the Nested Chinese Resturant Process," Proceedings of the 16th International Conference on NIPS, 2003, 17-24.

* cited by examiner

INTELLIGENT BOOKMARKING WITH COGNITIVE CAPABILITY

TECHNICAL FIELD

The present application relates generally to a system and method that are used to automatically generate bookmarks, so that the user can easily retrieve previous search results, such as important search results.

BACKGROUND

A re-finding system helps users retrieve the same documents or websites which they found in the previous searches. A re-finding system generally retrieves the same documents or websites in the same way as the previous searches, i.e., by typing in keywords and conducting a search that matches a previous search.

A much simpler technology to retrieve the same documents or websites found in the previous searches is directed to bookmarks. A typical example of bookmarks is the "favorite" folder incorporated in Internet Explorer browser. Bookmarks allow the user to have more control than a re-finding system, but require more manual effort. Specifically, bookmarks can be organized into topics and hierarchies, which enable users to navigate to the content they previously added into the bookmarks, without having to sift through large volumes of irrelevant content. However, organizing bookmarks requires additional manual effort.

Another common technology is "browser history", which is a function included in major web browsers. The "browser history" allows users to sift through all the websites they visited during a particular time interval. However, the users need to take considerable time and effort to find the desired content, because the browser history generally only shows names of the websites, and it is organized by time instead of content.

SUMMARY

Embodiments of the present application address and overcome one or more of the above shortcomings and drawbacks, by providing methods, systems, and computer program products related to a system for bookmarking.

Embodiments may provide a computer implemented method in a data processing system comprising a processor and a memory, the memory comprising instructions that are executed by the processor to cause the processor to implement a system for bookmarking, the method comprising receiving, by the processor, at least one search query from a user; returning, by the processor, a set of search results and a search score for each search result to the user; recording, by the processor, behavior of the user with respect to the search results and the search score; selecting, by the processor, at least one search result based on recorded behavior; determining, by the processor, at least one topic for the at least one selected search result; and generating, by the processor, a bookmark for each selected search result, under the at least one topic.

Embodiments may further provide a method further comprising performing, by the processor, a text analysis of the at least one search query, the search results, and a profile of the user, wherein the at least one topic is determined based on the text analysis.

Embodiments may further provide a method, wherein the behavior of the user includes viewing at least one particular search result, spending different time durations on each particular search result, and clicking on at least one link within the at least one particular search result.

Embodiments may further provide a method further comprising determining, by the processor, a general topic if the at least one topic is a subtopic of the general topic.

Embodiments may further provide a method further comprising retrieving, by the processor, any of the at least one selected search result, by navigating through the general topic and the at least one topic.

Embodiments may further provide a method further comprising presenting, by the processor, each generated bookmark and the corresponding topic to the user for a feedback.

Embodiments may further provide a method further comprising deleting, by the processor, at least one bookmark if the user fails to make any search query relevant to a particular topic corresponding to the at least one bookmark in a predetermined time interval.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

Embodiments may further provide a computer program, wherein the processor is further configured to be trained by human trainers with respect to filing each bookmark under the at least one topic, and grouping the at least one topic into the general topic.

In yet another illustrative embodiment, a system is provided. The system may comprise a bookmarking processor configured to perform various ones of, and combinations of, the operations outlined above with regard to the method illustrative embodiment.

Embodiments may further provide a system, wherein the bookmarking processor is further configured to present each generated bookmark and the corresponding topic to the user for a feedback. If the user accepts a particular bookmark and the corresponding topic, then the bookmarking processor is further configured to file the particular bookmark under the corresponding topic. If the user revises the corresponding topic, then the bookmarking processor is further configured to file the particular bookmark under a revised topic. If the user rejects the particular bookmark and the corresponding topic, then the bookmarking processor is further configured to ignore the particular bookmark.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The system and method of bookmarking can automatically generate bookmarks, with no or little human effort. A user may try to access information via a search engine, for example, Bing, Google, IBM Watson Discovery Service, etc., by performing a search query. The search engine may get a set of relevant search results (e.g., documents, passages, images) and present the search results to the user. The search engine may log the user's behavior. Specifically, the user may click on some of the search results, spend some time viewing some of the search results, or click on links within some of the search results, etc. The logged events, search scores provided by the search engine, and the text of the search results may then be fed into a binary statistical classifier that decides whether to generate an intelligent bookmark. If the bookmarking system decides to generate an intelligent bookmark for a relevant search result, for example a document, the bookmarking system may determine a topic label for the document using a combination of distinctive terms from the search query and/or the document itself and/or user's profile.

In some embodiments, the bookmarking system presents the determined topic to the user for approval. If the topic is approved by the user, then one or more bookmarks are generated under the topic. In other embodiments, the bookmarking system, automatically generates a new bookmark for the search result without involving the user. In some embodiments, the user makes multiple search queries in a single session, and all the search queries are related to the same topic. In this case, the bookmarking system would wait until several related search queries are complete, so that the text of all the search queries, the text of all the relevant search results or/and the logged behavior are considered to determine the topic.

Figure 1:
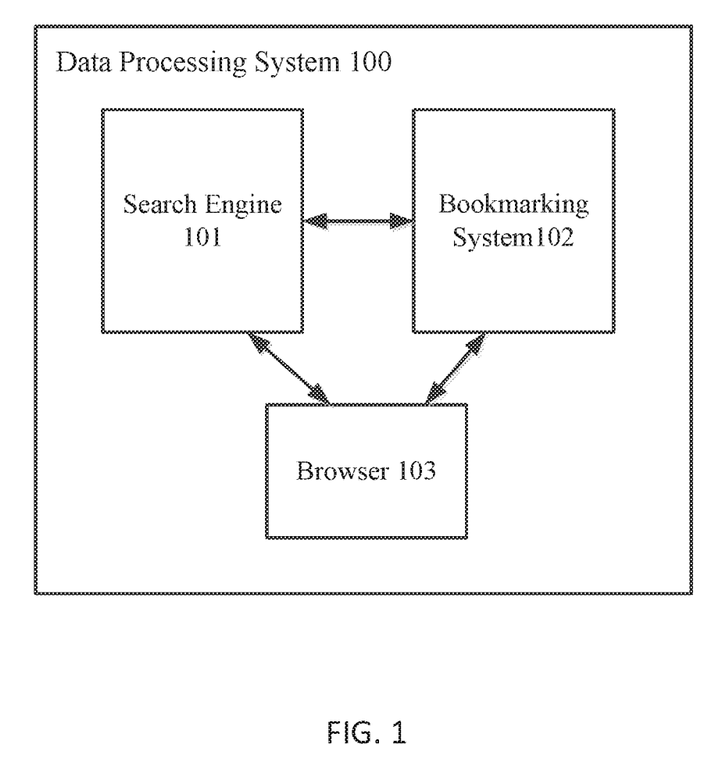
FIG. 1 is a block diagram of an example data processing system in which aspects of the illustrative embodiments are implemented.

FIG. 1 is a block diagram of an example data processing system 100 in which aspects of the illustrative embodiments are implemented. Data processing system 100 is an example of a computer, such as a server or client, in which computer usable code or instructions implementing the process for illustrative embodiments of the present invention are located. In one embodiment, the data processing system 100 represents a computing device, which implements bookmarking system 102 described herein.

In the depicted example, search engine 101, bookmarking system 102 and browser 103 are operating on the data processing system 100. The search engine 101 can be any search tool, such as Bing, Google, IBM Watson Discovery Service, etc., running on the browser 103. The browser 103 can be any web browser, such as Internet Explorer, Chrome, Safari, Opera and Firefox, etc.

Figure 2:
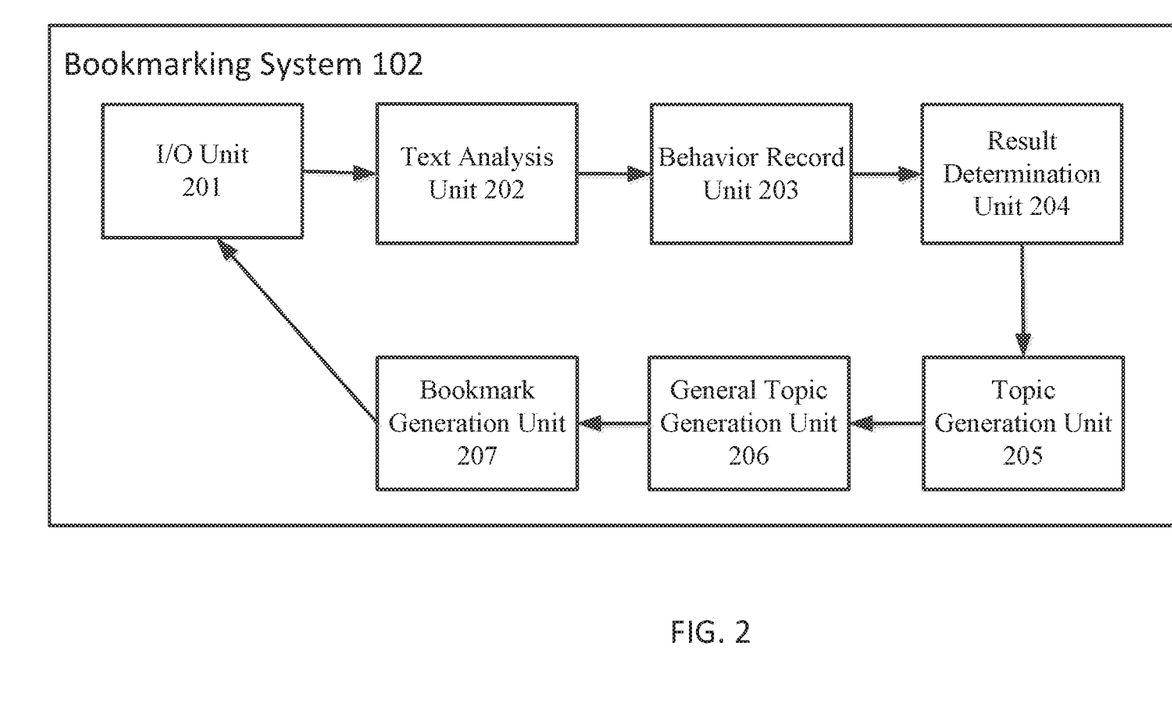
FIG. 2 is a block diagram of an example bookmarking system, according to some embodiments described herein.

FIG. 2 is a block diagram of an example bookmarking system 102, according to some embodiments described herein. In the depicted example, the bookmarking system 102 includes I/O unit 201, text analysis unit 202, behavior record unit 203, result determination unit 204, topic generation unit 205, general topic generation unit 206, and bookmark generation unit 207. The I/O unit 201 is configured to receive a search query input by a user, search results from the search engine 101 in view of the search query, and the user's profile. The I/O unit 201 is further configured to output generated bookmarks to the browser 103. The text analysis unit 202 is configured to perform text analysis of the search query, the search results, and the user's profile. The behavior record unit 203 is configured to keep a log of the user's behavior with respect to the search results. The result determination unit 204 is configured to select important search results for the user in view of the recorded user behavior. The topic generation unit 205 is configured to determine a topic for each important search result. The general topic generation unit 206 is configured to determine a more general topic for topics generated by the topic generation unit 205. The bookmark generation unit 207 is configured to generate a bookmark for each important search result, under the corresponding topic.

It will also be noted that each unit of the bookmarking system 102 may be implemented on a special purpose hardware-based system, for example the data processing system 100, which performs specified functions or acts or carries out combinations of special purpose hardware and computer instructions.

Figure 3:
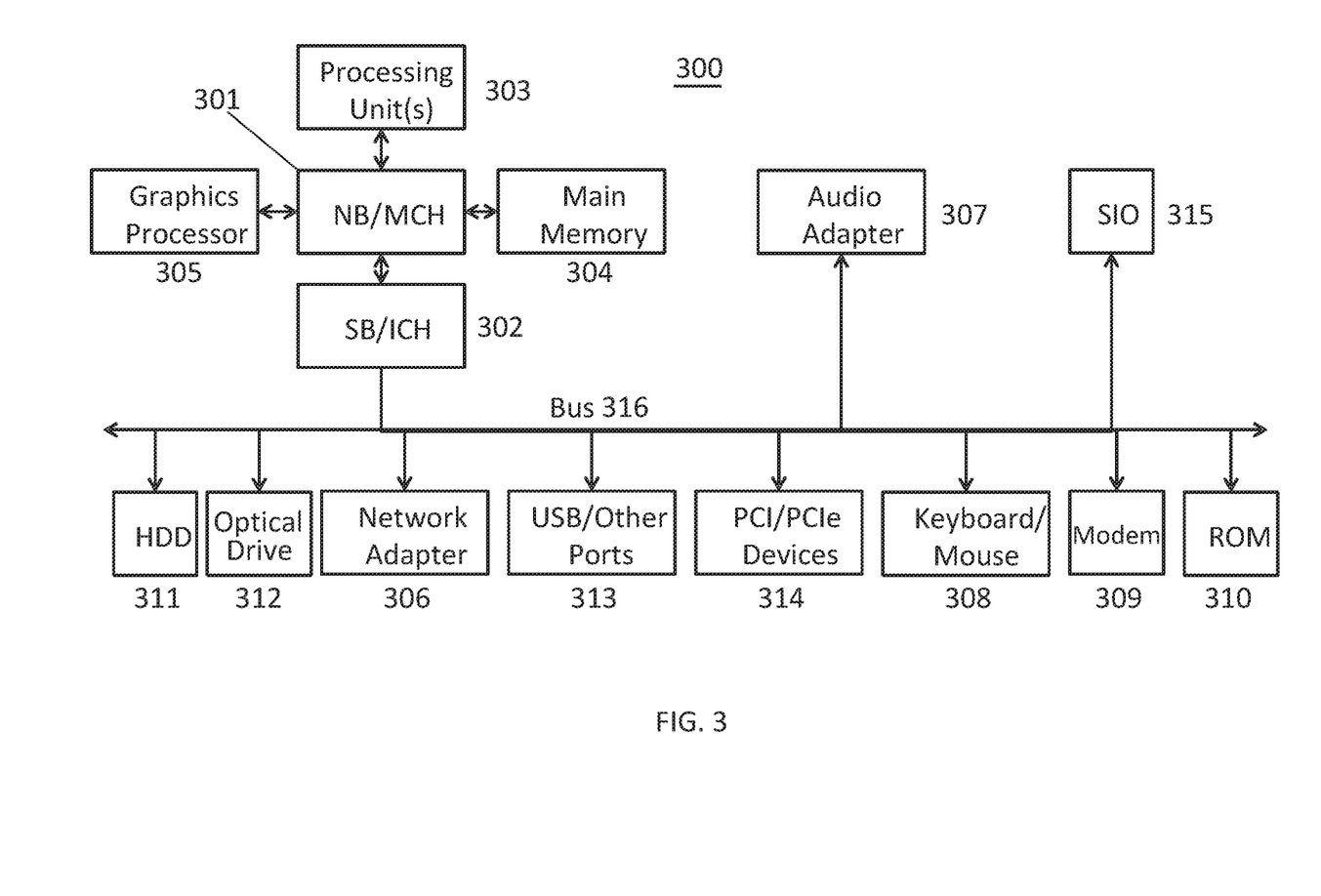
FIG. 3 is a block diagram of another example data processing system in which aspects of the illustrative embodiments are implemented.

FIG. 3 is a block diagram of an example data processing system 300 in which aspects of the illustrative embodiments may be implemented. In the depicted example, data processing system 300 employs a hub architecture including a north bridge and memory controller hub (NB/MCH) 301 and south bridge and input/output (I/O) controller hub (SB/ICH) 302. Processing unit 303, main memory 304, and graphics processor 305 are connected to the NB/MCH 301. Graphics processor 305 is connected to the NB/MCH through an accelerated graphics port (AGP) (not shown in FIG. 3).

In the depicted example, the network adapter 306 is connected to the SB/ICH 302. The audio adapter 307, keyboard and mouse adapter 308, modem 309, read only memory (ROM) 310, hard disk drive (HDD) 311, optical drive (CD or DVD) 312, universal serial bus (USB) ports and other communication ports 313, and the PCI/PCIe devices 314 are connected to the SB/ICH 302 through bus system 316. PCI/PCIe devices 314 include Ethernet adapters, add-in cards, and PC cards for notebook computers. ROM 310 may be, for example, a flash basic input/output system (BIOS). The HDD 311 and optical drive 312 use an integrated drive electronics (IDE) or serial advanced technology attachment (SATA) interface. The super I/O (SIO) device 315 is connected to the SB/ICH 302.

An operating system may run on processing unit 303. The operating system may coordinate and provide control of various components within the data processing system 300. As a client, the operating system may be a commercially available operating system. An object-oriented programming system, such as the Java™ programming system, may run in conjunction with the operating system and provide calls to the operating system from the object-oriented programs or applications executing on the data processing system 300. As a server, the data processing system 300 may be an IBM® eServer™ System P® running the Advanced Interactive Executive operating system or the Linux operating system. The data processing system 300 may be a symmetric multiprocessor (SMP) system that may include a plurality of processors in the processing unit 303. Alternatively, a single processor system may be employed.

Instructions for the operating system, the object-oriented programming system, and applications or programs are located on storage devices, such as the HDD 311, and are loaded into the main memory 304 for execution by the processing unit 303. The processes for embodiments of the bookmarking system may be performed by the processing unit 303 using computer usable program code, which may be located in a memory such as, for example, main memory 304, ROM 310, or in one or more peripheral devices.

A bus system 316 may be comprised of one or more busses. The bus system 316 may be implemented using any type of communication fabric or architecture that may provide for a transfer of data between different components or devices attached to the fabric or architecture. A communication unit such as the modem 309 or network adapter 306 may include one or more devices that may be used to transmit and receive data.

Those of ordinary skill in the art will appreciate that the hardware depicted in FIG. 3 may vary depending on the implementation. Other internal hardware or peripheral devices, such as flash memory, equivalent non-volatile memory, or optical disk drives may be used in addition to or in place of the hardware depicted. Moreover, the data processing system 300 may take the form of any of a number of different data processing systems, including but not limited to, client computing devices, server computing devices, tablet computers, laptop computers, telephone or other communication devices, personal digital assistants, and the like. Essentially, data processing system 300 may be any known or later developed data processing system without architectural limitation.

Figure 4:
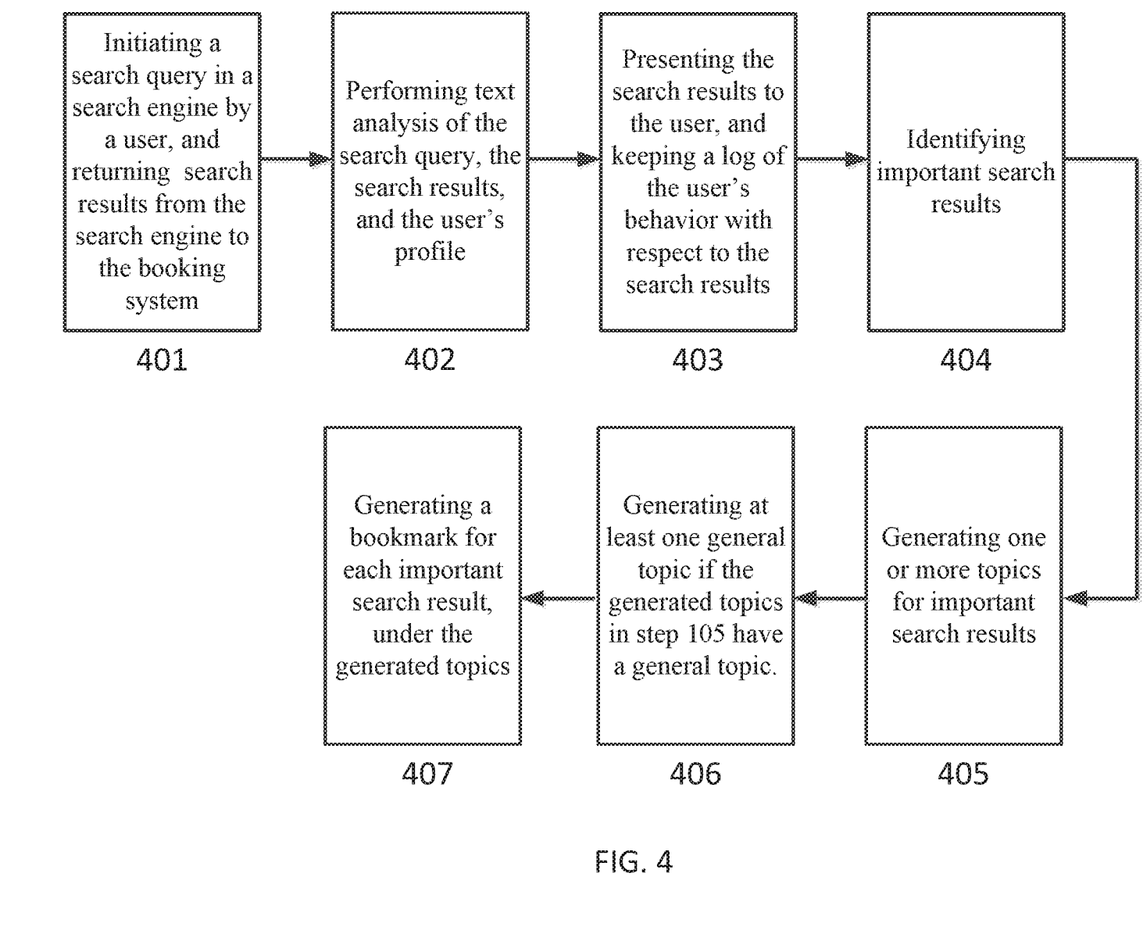
FIG. 4 depicts a flowchart illustrating the functionality of a bookmarking system, according to some embodiments described herein.

FIG. 4 depicts a flowchart illustrating the functionality of a bookmarking system, according to some embodiments described herein. In some embodiments, the bookmarking system can perform the following steps:

Step 401, a user initiates a search query in a search engine, for example, Bing, Google, IBM Watson Discovery Service etc., and then the search engine returns a set of search results to a bookmarking system.

Step 402, the bookmarking system performs text analysis of the search query, the search results, and the user's profile using natural language understanding system. Natural language understanding (NLU) is a subtopic of natural language processing in artificial intelligence that deals with machine reading comprehension. The user's profile can be obtained from a social media website or application, for example, LinkedIn, Facebook, WhatsApp, Twitter, Skype, etc.

Step 403, the bookmarking system presents the search results to the user, and keeps a log of the user's behavior with respect to the search results. Specifically, the bookmarking system records which results the user views, how long the user views each result, whether the user clicks on links within any result, etc.

Step 404, the bookmarking system selects certain search results, for example important search results for the user. Specifically, the bookmarking system uses a statistical classifier to determine whether each search result is important. The factors that the statistical classifier considers with respect to the importance include a search score from the search engine for each search result, and the log of the user's behavior for each search result. The search score is provided by the search engine to indicate the relevance of a search result to the search query. The user's behavior indicates how the user reacts to each search result. Specifically, the user may ignore some of the search results, click on some of the search results, spend some time viewing some of the search results, or click on links within some of the search results, etc.

In an embodiment, the statistical classifier is trained by one or more human trainers. After being trained by the human trainers, the statistical classifier can identify the importance of the search results. Specifically, the statistical classifier learns that any search results bookmarked by the human trainers are important, while the search results not bookmarked are unimportant. In another embodiment, the importance can be identified with an alternative standard. For example, if the search score from the search engine is more than or equal to a predetermined value, then the corresponding search result is an important search result. Conversely, if the search score from the search engine is less than the predetermined value, then the corresponding search result is an unimportant search result. For another example, if the user views a search result for over one minute, then the search result is an important search result. Conversely, if the user views a search result for less than one minute, then the corresponding search result is an unimportant search result. The examples of standards for importance/unimportance are intended to be non-limiting and is not exhaustive of all the possible standards. The statistical classifier may be implemented using Naïve Bayes, logistic regression, or deep learning, etc.

Step 405, if there is at least one important search result, the bookmarking system determines a topic for each important search result. The information used to determine the topic includes the text of the search query, the text of other recent search queries in the user's search history, the text of the important search result, the text of the user's profile, and the text analysis performed in the step 402. In other words, the information used to enable generation of the topic can be derived from the text of the search query, the text of the important search result, the text of other recent search queries in the user's search history, the text of the user's profile, and the text analysis performed in the step 402. In an embodiment, the information is extracted by topic modelling method, and may involve simple lexical match or more complex semantic match, for example synonyms, ontological distance, or semantic word vectors. Topic modeling is a text-mining tool for discovery of hidden semantic structures in a text body and used for discovering "topics" that occur in a collection of documents.

In some embodiments, the user makes multiple search queries in one or more search sessions on the same topic, therefore, the previous search queries in the user's search history may be related to the current search query. The bookmarking system can incrementally build up a collection of relevant bookmarks and group them together under the same topic. If the user switches to new search queries on an unrelated new topic, the bookmarking system would not group the new bookmarks corresponding to the new topic with the old bookmarks.

In an embodiment, the number of sessions is determined by the time gap between each search. For example, if the time gap between the last search query and the new search query is no more than one hour, then the last search query and the new search query are in the same session. However, if the time gap between the last search query and the new search query is more than one hour, then the last search query and the new search query are in different sessions. In another embodiment, the number of sessions is determined with respect to ontological similarity between the terms of the last search query and the terms of the new search query. For instance, if there is at least one term in the new search query, and the at least one term of the new search query is acquired by clicking no more than two links of at least one term in the last search query, then the last search query and the new search query are in the same session. However, if the at least one term of the new search query is acquired by clicking more than two links of at least one term in the last search query, then the last search query and the new search query are in different sessions.

In some embodiments, each important search result has a different topic. For instance, if there are five important search results, and each important search result has a different topic, then the bookmarking system generates five different topics. In other embodiments, some important search results have the same topic while the other important search results have different topics. For example, if there are five important search results, wherein two important search results have the same topic A, while the other three important search results have the same topic B, then the bookmarking system only generates two topics, i.e., topic A and topic B.

Step 406, the bookmarking system determines if each generated topic is a subtopic of a more general topic, using a hierarchical topic modeling method. As introduced in step 405, topic modeling is a text-mining tool for discovery of hidden semantic structures in a text body and used for discovering "topics" that occur in a collection of documents. If there is a more general topic, then the bookmarking system generates the more general topic having a higher hierarchy.

Step 407, the bookmarking system automatically generates a bookmark for each important search result, under the corresponding topic. In some embodiments, the bookmarking system presents each bookmark and the corresponding topic to the user, to inquire whether the user accepts, revises, or rejects the bookmark. If the user accepts the bookmark and the corresponding topic, then the bookmarking system generates the bookmark under the corresponding topic. If the user revises the corresponding topic, then the bookmarking system generates the bookmark under the revised topic. If the user rejects the bookmark and the corresponding topic, then the bookmarking system ignores the bookmark.

The steps 404-407 are all driven by a statistical classifier, and thus training data for the bookmarking system need to be provided. In some embodiments, the bookmarking system is trained by human trainers. The human trainers searches for information and manually decides what to bookmark, how to file the bookmarks under different topics, and how to group topics into higher-level topics. In the training process, in an embodiment, the bookmarking system operates via active learning. Instead of having the user make all these decisions manually, the bookmarking system actively decides which instances need manual decisions from the human trainers. For example, in an instance, it is highly uncertain which topic a bookmark can be filed in, then a manual decision may be made by the human trainers. Similarly, in other highly uncertain instances, the bookmarking system has a high expectation of significant learning, and thus a manual decision may be needed. In another embodiment, the bookmarking system only operates via manual learning, and all the decisions need to be made manually by the human trainers.

In some embodiments, the human trainers are employed by developers of the bookmarking system, either directly or via crowd-sourcing. In other embodiments, the human trainers are ordinary end users who choose to train the bookmarking system so that the bookmarking system would be more effective for the end users. In another embodiment, the human trainers are a combination of the employed trainers and the ordinary end users.

After the bookmarks are generated by the bookmarking system for certain results, for example, the important search results, the user may retrieve any of the important search results at any time. In some embodiments, the user makes a search query related to the desired result in the search engine. Among the search results presented by the search engine, the top search results are the important search results bookmarked by the bookmarking system. In this way, the bookmarking system retrieves important search results using a combination of both the generated bookmarks and the search engine. In other embodiments, the user navigates through the hierarchy of topics for the generated bookmarks, to locate the specific topic the user is looking for. The user may find the desired important search result among the bookmarks under that specific topic.

In some embodiments, old bookmarks are deleted to avoid having a huge collection of bookmarks, so that the user can easily locate the desired important search result. This step may be fully automatic without involving the user. The decision to delete a bookmark is motivated by changing content of the webpage. For example, the search result (a webpage) that is bookmarked may no longer exist, or may have been changed so dramatically that it is no longer relevant to the topic under which it is bookmarked. Additionally, the decision to delete a bookmark can be motivated by indicators that the user are no longer interested in the topic. For instance, the user has not made any search queries that are relevant to the topic in a predetermined time interval. For another example, the user does not use the topic, or navigate through the topic in a predetermined time interval. Alternatively, the bookmarking system may ask permission from the user before deleting any bookmarks. The bookmarking system can present old unused bookmarks to the user, to inquire whether the user chooses to delete them.

Figure 5:
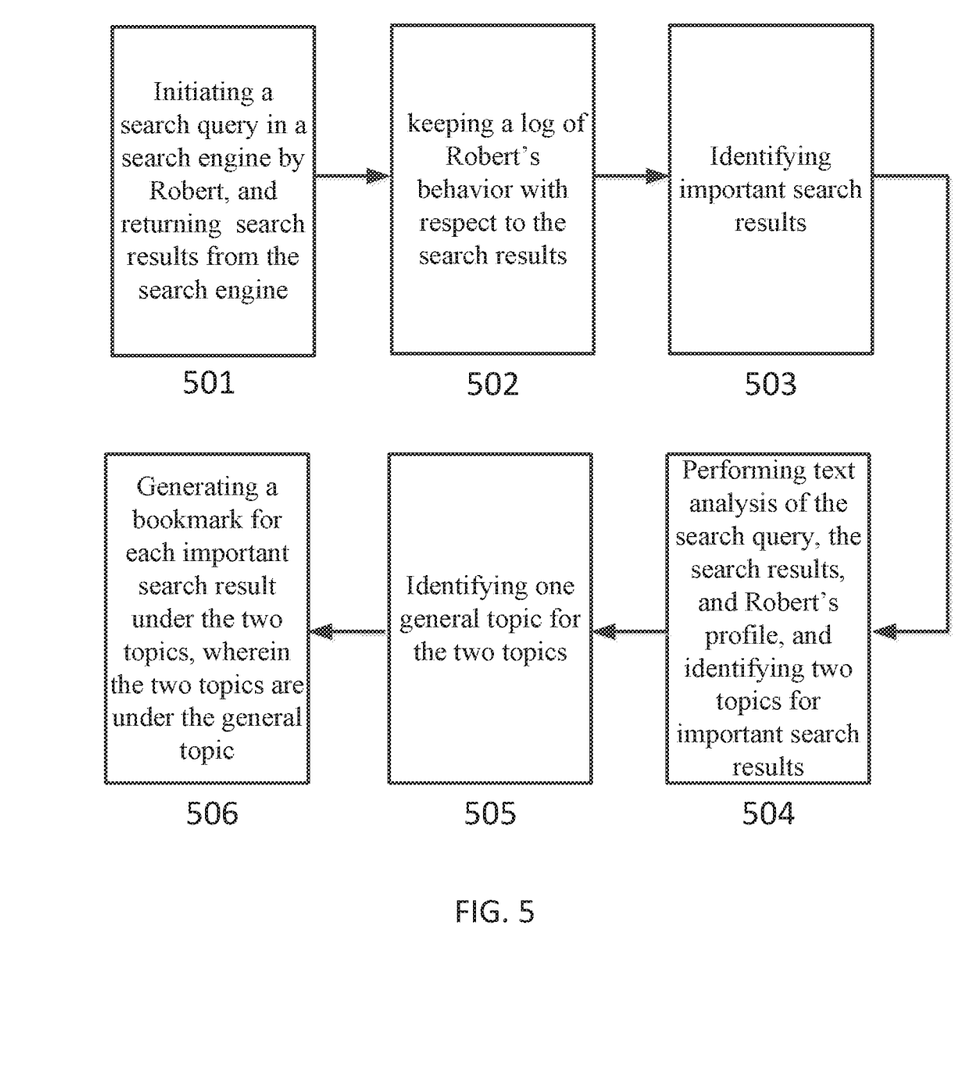
FIG. 5 depicts a flowchart illustrating an example of the functionality of a bookmarking system, according to some embodiments described herein.

FIG. 5 depicts a flowchart illustrating an example of the functionality of a bookmarking system, according to embodiments described herein. In the example, Robert is the end user and he has a social media profile that says "I am a biology researcher, and my areas of interest include birds, reptiles, and amphibians." The bookmarking system performs the following steps:

Step 501, Robert searches for the terms "Hida salamander habitat," "Hida salamander diet," "African striped frog habitat," "African striped frog diet," and "African striped frog climate" in IBM Watson Discovery Service. IBM Watson Discovery Service returns search results to the bookmarking system and Robert.

Step 502, the bookmarking system keeps a log of Robert's behavior with respect to the search results (webpages). Robert views some of webpages, and Robert spends more time viewing several webpages than other webpages. In a few cases, Robert clicks on links within some of the webpages.

Step 503, based on the logged behavior, the bookmarking system decides that some of the webpages are important and plans to generate bookmarks for the important webpages.

Step 504, the bookmarking system performs text analysis of the search query, webpages, and Robert's profile, and identify relevant topics for the important webpages. Specifically, the bookmarking system observes that the term "Hida salamander" is a distinctive term in the first two search queries and the webpages obtained from these two search queries. The bookmarking system also observes that the term "African striped frog" is a distinctive term in the next three search queries and the webpages obtained from these three search queries.

Step 505, the bookmarking system observes that the term "amphibian" is a common term in the webpages from all five search queries and is also a key term in the Robert's social profile. The bookmarking system further determines that the terms "Hida salamander" and "African striped frog" are subtopics of the term "amphibian."

Step 506, the bookmarking system automatically generates a bookmark for each important webpage. The bookmarking system groups the important webpages into two categories respectively labeled with "Hida salamander" and "African striped frog," and these two categories are subcategories of a higher level category labeled with "amphibian."

A few weeks later, Robert wants to retrieve one important webpage having a document about the African striped frog. Robert can retrieve this important webpage in either way below:

A) Robert inputs "African striped frog" into search box of the IBM Watson Discovery Service, and some of the returned top search results are the ones the bookmarking system bookmarks for Robert; or B) Robert navigates through the hierarchy of the generated bookmarks. He clicks on "amphibian" to drill down into this high level topic. Underneath the topic of "amphibian," Robert clicks on "African striped frog" and sees a list of webpages that the bookmarking system recorded for Robert under the topic of "African striped frog."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory, the memory comprising instructions that are executed by the processor to cause the processor to implement a system for bookmarking, the method comprising:
   receiving, by the processor, at least one search query from a user;
   returning, by the processor, a set of search results and a search score for each search result to the user;
   recording, by the processor, behavior of the user with respect to the search results;
   performing, by the processor, a text analysis of the at least one search query, the search results, and a social media profile of the user;
   selecting, by the processor, at least one search result based on recorded behavior and the search score using a binary statistical classifier;
   determining, by the processor, at least one topic for the at least one selected search result based on the text analysis using a hierarchical topic modelling method; and
   generating, by the processor, a bookmark for each selected search result, under the at least one topic.

2. The method as recited in claim 1, wherein the behavior of the user includes viewing at least one particular search result, spending different time durations on each particular search result, and clicking on at least one link within the at least one particular search result.

3. The method as recited in claim 1, further comprising:
   determining, by the processor, a general topic for the at least one topic, wherein the at least one topic is a subtopic of the general topic.

4. The method as recited in claim 3, further comprising:
   retrieving, by the processor, any of the at least one selected search result, by navigating through the general topic and the at least one topic,
   wherein the at least one selected search result is an important search result for the user.

5. The method as recited in claim 1, further comprising:
   presenting, by the processor, each generated bookmark and the corresponding topic to the user for a feedback.

6. The method as recited in claim 1, further comprising:
   deleting, by the processor, at least one bookmark if the user fails to make any search query relevant to a particular topic corresponding to the at least one bookmark in a predetermined time interval.

7. A computer program product for bookmarking, the computer program product comprising a computer readable storage medium having program instructions embodied therewith, the program instructions executable by a processor to cause the processor to:
   receive at least one search query from a user;
   return a set of search results and a search score for each search result to the user;
   record behavior of the user with respect to the search results;
   perform a text analysis of the at least one search query, the search results, and a social media profile of the user;
   selecting at least one search result based on recorded behavior and the search score using a binary statistical classifier;

determine at least one topic for the at least one selected search result based on the text analysis using a topic modelling method; and generate, a bookmark for each selected search result, under the at least one topic.

8. The computer program product as recited in claim 7, wherein the behavior of the user includes viewing at least one particular search result, spending different time durations on each particular search result, and clicking on at least one link within the at least one particular search result.

9. The computer program product as recited in claim 7, wherein the processor is further configured to determine a general topic for the at least one topic, wherein the at least one topic is a subtopic of the general topic.

10. The computer program product as recited in claim 9, wherein the processor is further configured to retrieve any of the at least one selected search result, by navigating through the general topic and the at least one topic, wherein the at least one selected search result is an important search result for the user.

11. The computer program product as recited in claim 9, wherein the processor is further configured to be trained by human trainers with respect to filing each bookmark under the at least one topic, and grouping the at least one topic into the general topic.

12. The computer program product as recited in claim 7, wherein the processor is further configured to present each generated bookmark and the corresponding topic to the user for a feedback.

13. The computer program product as recited in claim 7, wherein the processor is further configured to delete at least one bookmark if the user fails to make any search query relevant to a particular topic corresponding to the at least one bookmark in a predetermined time interval.

14. A system for bookmarking, comprising:
a bookmarking processor configured to:
receive at least one search query from a user;
return a set of search results and a search score for each search result to the user;
record behavior of the user with respect to the search results;
perform a text analysis of the at least one search query, the search results, and a social media profile of the user;
select at least one search result based on recorded behavior and the search score using a binary statistical classifier;
determine at least one topic for the at least one selected search result based on the text analysis using a hierarchical topic modelling method; and
generate, a bookmark for each selected search result, under the at least one topic.

15. The system as recited in claim 14, wherein the behavior of the user includes viewing at least one particular search result, spending different time durations on each particular search result, and clicking on at least one link within the at least one particular search result.

16. The system as recited in claim 14, wherein the bookmarking processor is further configured to determine a general topic for the at least one topic, wherein the at least one topic is a subtopic of the general topic.

17. The system as recited in claim 16, wherein the bookmarking processor is further configured to retrieve any of the at least one selected search result, by navigating through the general topic and the at least one topic, wherein the at least one selected search result is an important search result for the user.

18. The system as recited in claim 14, wherein the bookmarking processor is further configured to delete at least one bookmark if the user fails to make any search query relevant to a particular topic corresponding to the at least one bookmark in a predetermined time interval.

19. The system as recited in claim 14, wherein the bookmarking processor is further configured to present each generated bookmark and the corresponding topic to the user for a feedback;

if the user accepts a particular bookmark and the corresponding topic, then the bookmarking processor is further configured to file the particular bookmark under the corresponding topic; if the user revises the corresponding topic, then the bookmarking processor is further configured to file the particular bookmark under a revised topic; if the user rejects the particular bookmark and the corresponding topic, then the bookmarking processor is further configured to ignore the particular bookmark.

* * * * *